United States Patent
Agrati

(10) Patent No.: US 6,283,521 B1
(45) Date of Patent: Sep. 4, 2001

(54) SUPPORT AND CONTROL DEVICE FOR OPENING OR CLOSING A GRIP ELEMENT IN TWO PARTS

(75) Inventor: Giuseppe Agrati, Vittuone (IT)

(73) Assignee: G. Agrati S.n.c. di Agrati Giuseppe & C., Vittuone (IT)

( * ) Notice: Subject to any disclaimer, the term of this patent is extended or adjusted under 35 U.S.C. 154(b) by 0 days.

(21) Appl. No.: 09/531,556

(22) Filed: Mar. 20, 2000

(30) Foreign Application Priority Data

Mar. 19, 1999 (IT) .............................................. MI99A0558

(51) Int. Cl.$^7$ ...................................................... A01D 7/04
(52) U.S. Cl. .................... 294/50.8; 294/19.1; 56/400.12; 56/400.19
(58) Field of Search .................................. 294/19.1, 50.8, 294/50.9, 51, 115; 56/400.11, 400.12, 400.16, 400.19

(56) References Cited

U.S. PATENT DOCUMENTS

| | | | |
|---|---|---|---|
| 1,903,097 | * | 3/1933 | Dunford et al. ........................ 294/51 |
| 3,208,786 | * | 9/1965 | Eddleman ............................ 294/115 |
| 3,601,966 | * | 8/1971 | Kerry .................................. 294/19.1 |
| 4,215,528 | * | 8/1980 | Fodor .................................... 294/51 |
| 4,684,128 | * | 8/1987 | Verstraeten .......................... 294/115 |
| 4,854,626 | * | 8/1989 | Duke .................................. 294/19.1 |
| 4,930,824 | * | 6/1990 | Matthew et al. ..................... 294/19.1 |
| 5,630,243 | * | 5/1997 | Federico et al. ..................... 294/19.1 |
| 5,857,529 | * | 1/1999 | Nguyen ............................... 294/50.8 |
| 6,017,070 | * | 1/2000 | Poppa ................................. 294/19.1 |
| 6,139,077 | * | 10/2000 | Molzan, II .......................... 294/19.1 |

FOREIGN PATENT DOCUMENTS

| | | | |
|---|---|---|---|
| 775450 | * | 1/1968 | (CA) .................................. 294/50.8 |
| 1363431 | * | 5/1964 | (FR) ................................... 294/115 |
| 1484711 | * | 6/1989 | (SU) ................................... 294/115 |

* cited by examiner

*Primary Examiner*—Eileen D. Lillis
*Assistant Examiner*—Paul T. Chin
(74) *Attorney, Agent, or Firm*—Jacobson Holman, PLLC

(57) ABSTRACT

A support and control device (11) for opening or closing a grip element (19) in two parts, where the two parts can mutually rotate in order to grip objects, the device (11) comprising a body (12) to which a handle (14) is connected, bearing a control sleeve (20) operationally connected, through a cable (23), to drive gears (26,29) to range the two parts of the grip element (19) between a first, open, position and a second, closed, position where the two parts determine a space for containing the objects to be gripped and/or picked up, in which the drive gears (26,29) comprise a kinematic motion mechanism, internal to the body (12), controlled by the cable (23), an exit-part controlling the kinematic mechanism, bearing the grip-element (19), being positioned according to an axis substantially parallel to that of movement of the cable (23).

10 Claims, 5 Drawing Sheets

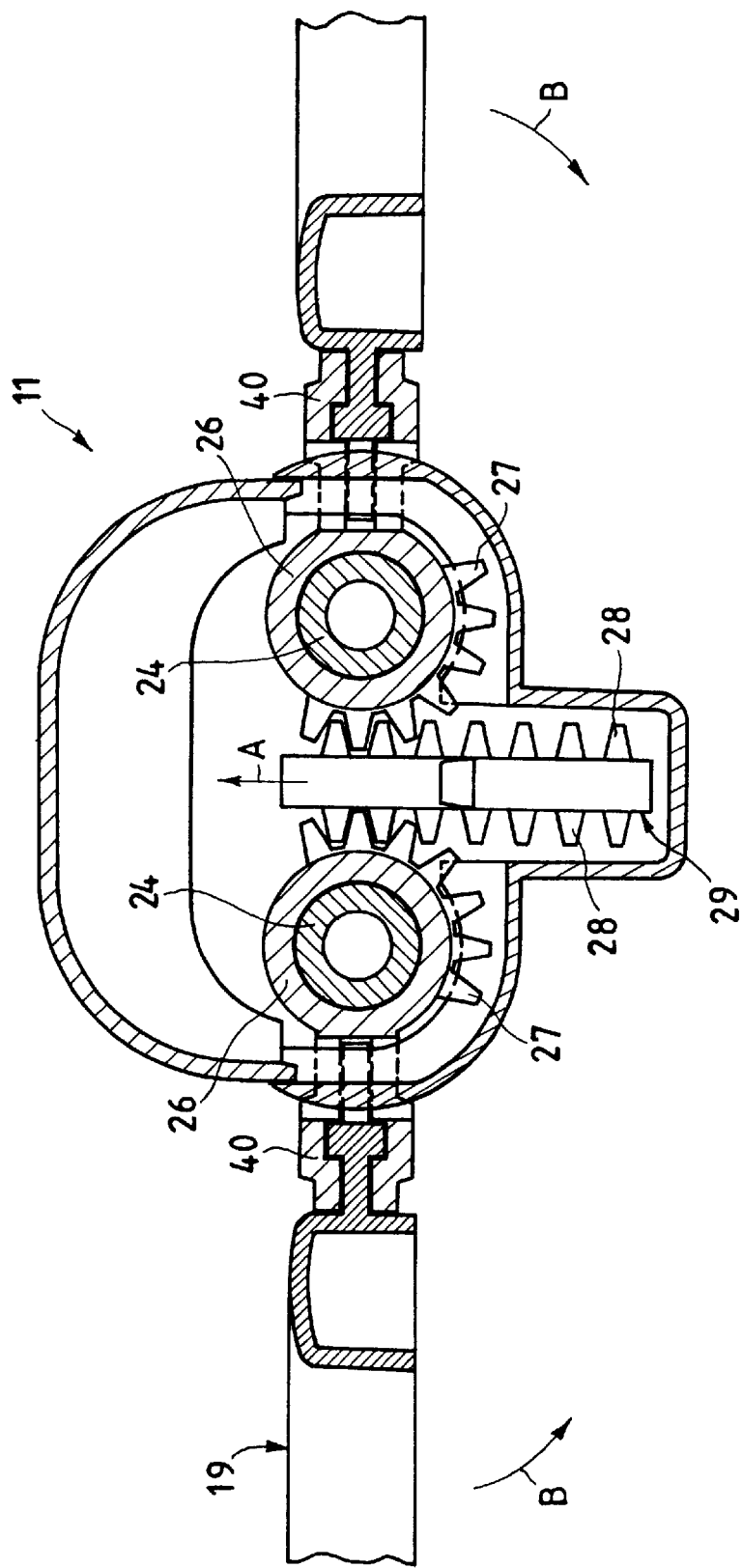

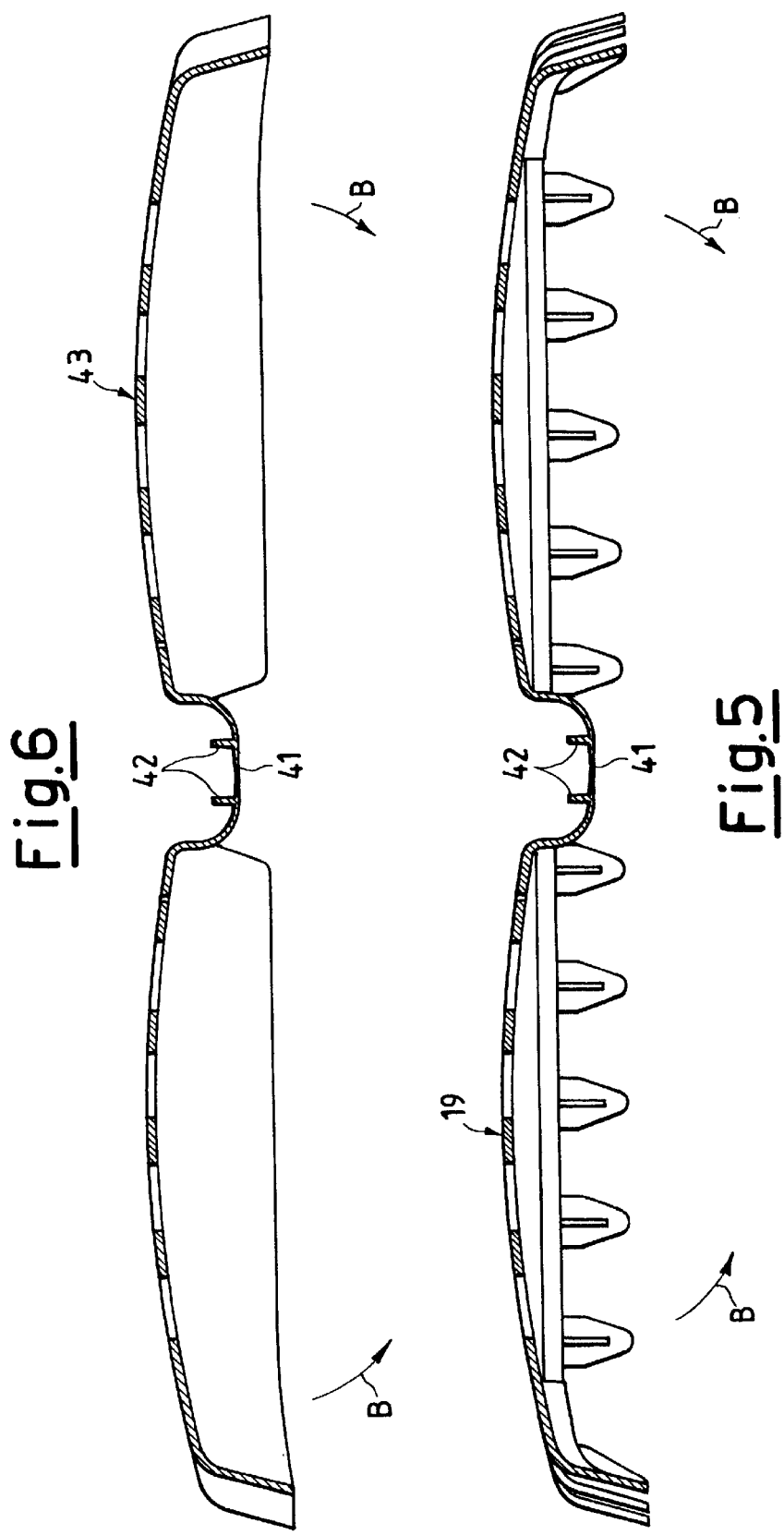

SUPPORT AND CONTROL DEVICE FOR OPENING OR CLOSING A GRIP ELEMENT IN TWO PARTS

BACKGROUND OF THE INVENTION

The present invention refers to a support and control device for opening or closing a grip element in two parts.

When manipulator devices are used, which allow reaching to positions that are not reachable, or anyway reachable with difficulty, it is usually extremely useful to grip various objects or elements. This can occur both from necessity, for example in the case of devices for picking fruit from a tree, and from convenience, for example in the case of devices for picking up objects from the ground. In the following, reference will be made in particular to a support device for a rake, permitting its closure for gripping and holding leaves and like objects. A similar device can, of course, be applied to any other means.

It is known that closable rakes comprise two parts, symmetrical in structure, mutually hinged and connected to a tubular handle. The handle supports a closing-control for the two structure parts; this is composed of a sleeve to which the first ends of a pair of cables are fixed. The opposite ends of each of these cables are each fixed to one of the two structure parts so that, when the sleeve is made to translate along the handle by an operator, pulling or loosening the cables, this causes the closing or opening of the two parts of the rake.

This type of traditional support device is notoriously difficult and inconvenient to use since the cables extend substantially along a coaxial direction and/or parallel to the handle and to a rotation axis of the two structure parts of the rake. This, allied to the fact that the cables are directly connected to the two structure parts, means that considerable force is necessary for driving the device. In addition, the traditional support device structure is complex and, usually, unreliable.

DESCRIPTION OF THE RELEVANT ART

BRIEF SUMMARY OF THE INVENTION

The object of the present invention is to eliminate the technical disadvantages encountered, by making a support and control device for opening or closing a grip element in two parts, which can be operated simply and conveniently and also in such a way that the operator is not required to use excessive force to operate it.

A further object of the invention is to make a support and control element which is substantially simple, safe and reliable.

These and other objects, according to the present invention, are achieved by making a support and control device for opening or closing a grip element in two parts, according to claim 1.

Other features of the present invention are, moreover, defined in the subsequent claims.

The support and control device according to the present invention has the advantage of an automatic locking system which prevents it being closed accidentally.

Further features and advantages of a support and control device for opening or closing a grip element in two parts according to the present invention will become more evident from the following description, which is illustrative and non-limiting, referring to the attached schematic drawings, in which:

BRIEF DESCRIPTION OF THE DRAWINGS

FIG. 4 shows a section made along line IV—IV of FIG. 1;

FIG. 5 shows a section made along line V—V of FIG. 1, showing a rake applied to the support device according to the invention.

FIG. 6 shows a section made along line V—V of FIG. 1, showing a pliers tool applied to the support device according to the invention.

DETAILED DESCRIPTION OF THE INVENTION

Figure 1:
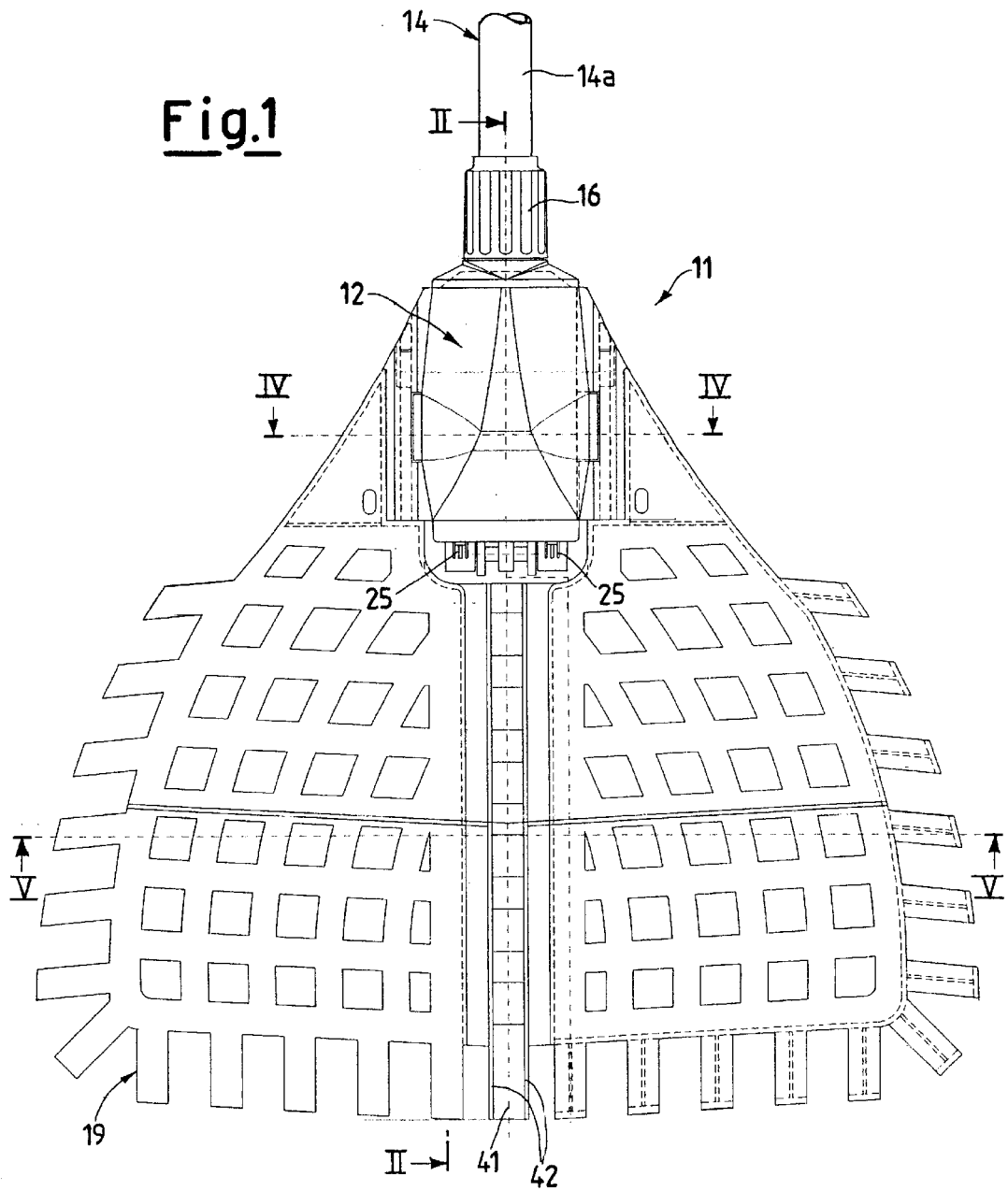
FIG. 1 shows a plan view of a rake carrying a support and control device according to the invention.
Figure 2:
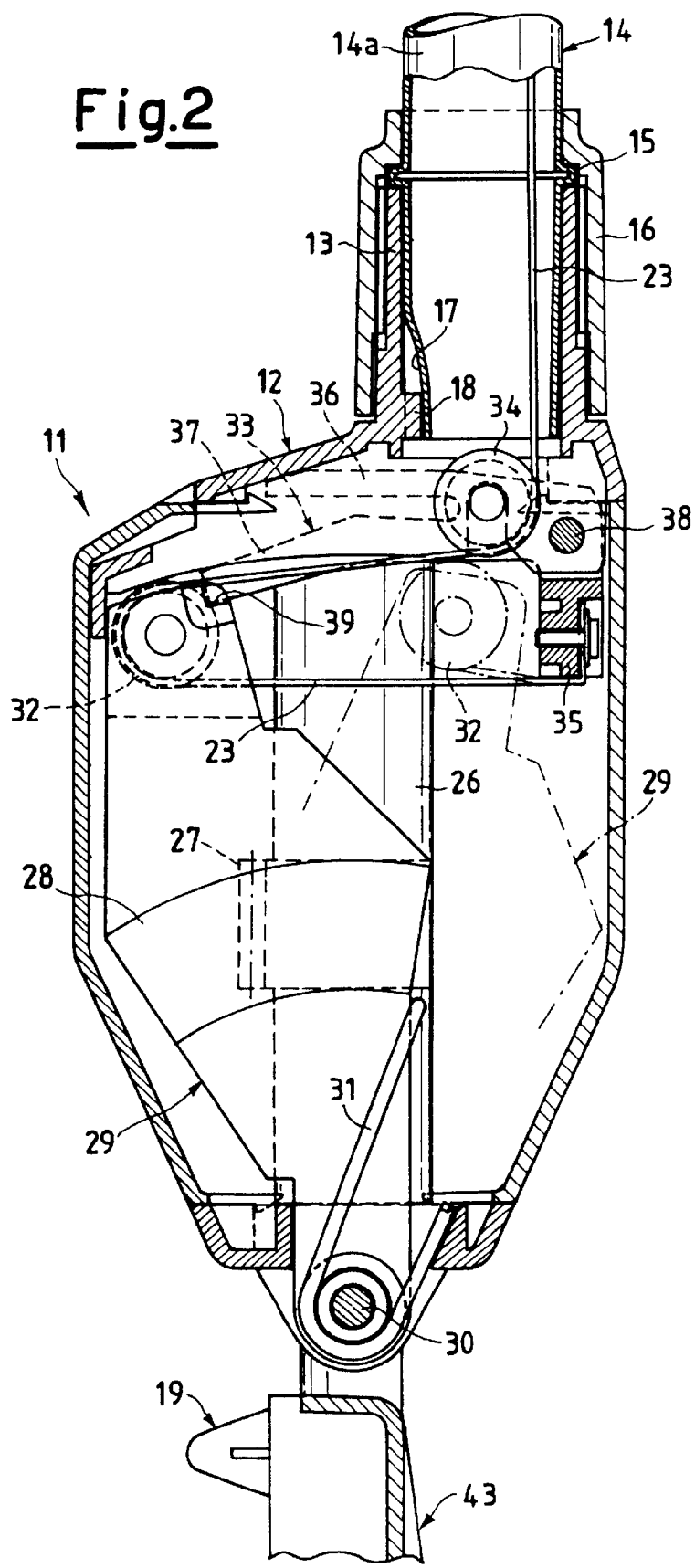
FIG. 2 shows an enlarged section of the device according to the invention, made along line II—II of FIG. 1.
Figure 3:
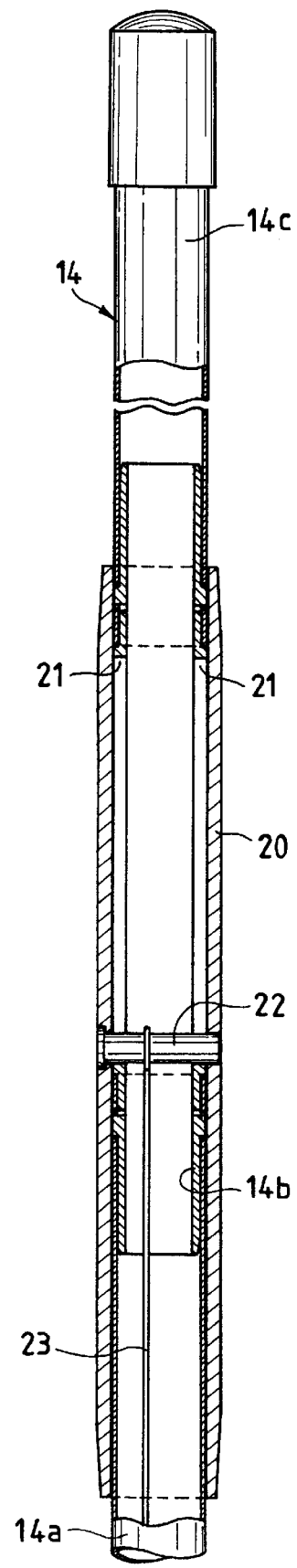
FIG. 3 shows an enlarged section of a part of the rake handle, adopting the support and control device according to the invention in FIG. 1.

With reference to the abovementioned figures, a support and control device for opening or closing a grip element in two parts is shown, the whole being indicated by reference number 11.

The support device 11 consists of a box-shaped body made in several elements that are mutually connected with spring locks. The body 12 shows, integral to its own back wall, a sleeve-extension 13 into which a tubular handle 14 is inserted. The handle 14 shows an enlarged circumferential appendix 15 placed against a front part of extension 13 and locked by means of a threaded locknut 16 screwed onto a corresponding screw thread of the sleeve-extension 13. In addition, the handle 14 shows a groove 17 into which is inserted a cog 18 integral to a bottom part of extension 13.

The handle 14 is preferably made in three parts, a lower part 14a, an intermediate part 14b and an upper part 14c. The intermediate part 14b carries control means for closing the grip element 19 of the rake. This control means is composed of a sleeve 20 inserted to run smoothly on the handle 14 corresponding to its slots 21 made on diametrically opposite parts of the intermediate part 14b. Inside the sleeve 20 and preferably along one of its own diameters, there is fixed a pin 22, which is in its turn inserted into slots 21. Onto the pin 22, there is fixed a cable 23 which controls control means for ranging the two parts of the grip element 19 between a first, open position and a second, closed position, where the two parts determine a containment space of objects to be gripped and/or picked up. The control means is composed of a kinematic motion mechanism contained inside the body 12.

The body 12 shows on its inside a pair of tubular elements 24 which are integral to the back wall of the body 12 and protrude from one of its front walls, to which they are fixed by means of spring-locks 25. Above each tubular element 24 there is inserted, in such a way that it can rotate, a sleeve 26 with a toothed part 27. These toothed parts 27 engage with corresponding toothed parts 28 of a lever 29. The lever 29 pivots on a fulcrum at one of its ends opposite to the one positioned towards the handle 14, on its own axis 30 supported by appendices integral to the front wall of the body 12, and is maintained in a rest position (corresponding to an opening position of the grip element 19) by a counter spring 31. The lever 29 presents its own toothed parts 28, ring-sector in shape, and in addition, it carries, connected in a rotational manner to one of the ends opposite to its own pivot point, a reel 32 on which the cable 23 is wound. The cable 23 shows a terminal fixed by means of a screw to an elastic component 33 inside the body 12; an intermediate part of this is wound onto reel 32 and then onto a second reel 34 housed in the body 12 substantially in a front position with respect to the sleeve extension 13 and slightly off-line with respect to the axis of the handle 14. A subsequent part of the cable 23 is inserted inside the handle 14 to be locked, as has been more clearly specified, onto pin 22. An exit area 43 driving said kinematic motion mechanism, bearing said grip element 19, is placed on an axis substantially parallel to that of movement of the cable 23. In addition, the axis on which the exit-area 43 driving the kinematic motion mechanism is placed, and the movement axis of the cable 23, are mutually off-line.

The elastic component 33 is shaped, in a front view (not shown), with a base part 35 from which there extend two shaped plates each of which defines a pair of prongs 36,37. A part of these plates near to the base 35 shows a slot 38 for a pivot on an axis of the body 12 around which the component 33 can rotate. The base part 35 comprises a threaded through-hole into which the mounting-screw for the cable 23 is inserted. A first pair of prongs 36 is adjacent to the body 12 and is elastically compliant. Each prong 36 is shaped like a rectangular plate and is chamfered on its tip on contact with the wall of the body 12. A second pair of prongs 37 is substantially divergent with respect to the first pair of prongs 36. Each of the prongs 37 shows one of its ends extending in such a way that it can be inserted in gaps 39 of the lever 29 so that it can be locked.

From the body 12, there protrude supports 40 that are, on one side, integral to the sleeves 26 and on the other, carry the grip element in two parts 19 which, for example, is of mesh-type and fitted with teeth on its edges.

In a preferred embodiment, the grip element 19 is made in two parts mutually integral through a junction 41 made in flexible material and fitted with stiffening ribs 42.

The operation of a support and control device for opening or closing a grip element in two parts, according to the present invention, is substantially as follows:

In a rest position with the grip element 19 open, the lever 29 is in a position adjacent to a wall of the body 12 and at the maximum distance from the base part 35 of the elastic component 33. In this situation, the cable 23, returned by the reels 32,34, holds back the sleeve 20 at the stroke end of the slots 21 on the side of device 11, while the ends of component 33, engaged in gap 39, lock the lever 29, preventing the accidental closure of the grip element 19.

In this configuration, the rake can be used as a traditional rake, without a device allowing the closure of its grip element 19, to collect and/or pile up leaves, paper or the like.

The operation of the device according to the invention and the consequent closure of the grip element 19 is carried out by pulling the sleeve 20, making it run along the handle 14. The sleeve 20 pulls, in its turn, the cable 23 which controls the closure of the element 19. In fact, in a first phase, the prongs 37 prevent the oscillation of the lever 29 around the axis 30. In this situation the cable 23, returned by reels 32,34, pulls the component 33 making it rotate around the axis inserted in the slots 38. The prongs 36 yield elastically in such a way that the prongs 37 are released from the gaps 39. At this point the lever 29 is free to oscillate as indicated by the arrow A, moving, when the surfaces are completely closed, into a position adjacent to the base 35 of the component 33. The oscillation of the lever 29 causes the sleeves 26 to rotate and, therefore, the grip sleeve 19 to close, as indicated by the arrows B.

A different embodiment of the support and control device 11 according to the present invention is shown in FIG. 6. In particular, FIG. 6 shows a pliers tool 43 which can be properly used to grip for example fruit from a tree, or to pick up objects and/or refuse from the ground.

It has been observed in practice how a support and control device for opening and closing a grip element in two parts, according to this invention, is particularly advantageous since it can be operated without the operator being required to use excessive force for its operation. In addition, this support and control device is fitted with an automatic locking system able to prevent the accidental closure of means. This makes its use particularly convenient and safe.

A support and control device conceived in this way is susceptible to numerous modifications and variations, all of which come within the scope of the invention; in addition, all the details can be substituted with technically equivalent elements.

In practice, the materials used, as well as the dimensions, can be varied according to technical requirements.

What is claimed is:

1. A support and control device for opening or closing a grip element including two parts symmetrical in structure which mutually rotate to grip objects where said device comprises:

a box-shaped body with elements connected with spring locks;

to which a tubular handle made of three parts: a lower part; an intermediate part and an upper part is inserted wherein said intermediate part contains;

a control means for opening and closing said grip element connected to;

at least one cable, which maintains said two parts of grip element between a first, open position and a second closed position through the use of;

a mechanism operated via kinetic motion contained inside the box-shaped body which further contains a lever; and an exit-area bearing said grip element, which drives said mechanism operated via kinetic motion, placed on an axis substantially parallel to said cable where movement of said axis and said cable is off-line;

wherein said lever is associated with a sleeve and is composed of at least one toothed-part engaging corresponding toothed-parts of said sleeve so as to pivot on a fulcrum in order to support the grip element.

2. The support device according to claim 1, wherein said toothed-part of said lever is ring-sector shaped.

3. The support device according to claim 2, wherein said lever is pivoted at one end opposite to that positioned toward said handle.

4. The support device according to claim 3, wherein said lever carries at least one reel connected in a revolving manner to an end opposite to the pivoted end, one said reel winding at least one cable having at least one end fixed inside said body, the intermediate part of said cable winding onto at least one second reel which returns a subsequent part of said cable inside said handle.

5. The support device according to claim 4, wherein said cable is fixed to at least one resilient locking component of said lever.

6. The support device according to claim 5, wherein said resilient component is shaped with a base part from which extend two shaped plates, each of which determines at least a pair of prongs, in its own lower part said elastic component showing at least one slot for a pivot around which said element can oscillate, a first pair of said prongs being elastically compliant and being in contact with the wall of said body, a second pair of prongs being substantially divergent with respect to said first pair of prongs, showing ends which extend so that they can be inserted in gaps of said lever.

7. The support device according to claim 4, wherein said second reel is housed inside said body substantially in a front position to said sleeve extension and slightly off-line with respect to an axis of said handle.

8. The support device according to claim 4, wherein said control means comprises at least one sleeve inserted to run smoothly on said handle to correspond with its slots, inside said sleeve being fixed at least one pin, in its turn inserted in said slots, on said pin being fixed said cable.

9. The support device according to claim 1, wherein said grip element is made in two parts mutually integral through a flexible junction fitted with stiffening ribs.

10. The support device according to claim 1, wherein said grip element is composed of a rake.

* * * * *